United States Patent
Doggett et al.

(10) Patent No.: US 9,317,839 B2
(45) Date of Patent: Apr. 19, 2016

(54) AUTOMATIC CONTACT LINKING FROM MULTIPLE SOURCES

(75) Inventors: Chani Ayn Doggett, Redmond, WA (US); Gregory Alan Howard, Bellevue, WA (US); Rebecca Anne Muraira, Redmond, WA (US); James Chun-Yuan Lee, Redmond, WA (US); Kenneth Wolfe, Mercer Island, WA (US); Naud Frijlink, Seattle, WA (US); Christer Garbis, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 629 days.

(21) Appl. No.: 12/900,167

(22) Filed: Oct. 7, 2010

(65) Prior Publication Data

US 2012/0089644 A1  Apr. 12, 2012

(51) Int. Cl.
G06F 17/30 (2006.01)
G06Q 10/10 (2012.01)
H04L 29/12 (2006.01)
H04L 12/58 (2006.01)

(52) U.S. Cl.
CPC .............. *G06Q 10/109* (2013.01); *H04L 51/32* (2013.01); *H04L 61/1594* (2013.01)

(58) Field of Classification Search
CPC .. G06Q 10/109; H04L 51/32; H04L 61/1594; Y10S 707/99954; H04M 1/72566
See application file for complete search history.

(56) References Cited

U.S. PATENT DOCUMENTS

| | | | |
|---|---|---|---|
| 7,360,172 B2 | 4/2008 | Grossman et al. | |
| 7,360,174 B2 | 4/2008 | Grossman et al. | |
| 7,657,540 B1* | 2/2010 | Bayliss | 707/999.1 |
| 7,925,620 B1* | 4/2011 | Yoon | 707/609 |
| 2003/0078981 A1* | 4/2003 | Harms et al. | 709/206 |
| 2003/0158860 A1* | 8/2003 | Caughey | 707/200 |
| 2004/0107283 A1 | 6/2004 | Paddon | |
| 2005/0027716 A1* | 2/2005 | Apfel | 707/100 |
| 2006/0085483 A1* | 4/2006 | Mooney et al. | 707/200 |
| 2006/0195472 A1* | 8/2006 | Cadiz et al. | 707/104.1 |
| 2006/0195474 A1* | 8/2006 | Cadiz et al. | 707/104.1 |
| 2007/0064920 A1* | 3/2007 | Ruckart | 379/355.07 |
| 2008/0250066 A1* | 10/2008 | Ekstrand et al. | 707/104.1 |
| 2008/0256170 A1 | 10/2008 | Hayashi et al. | |

(Continued)

OTHER PUBLICATIONS

Bonz, "Choosing a Smartphone, Part 2: Android vs. Palm WebOS", Retrieved at <<http://www.bonznumber1.com/other/choosing-a-smartphone-part-2-android-vs-palm-webos-%E2%80%93-updated/>>, Jun. 2, 2010, pp. 7.

(Continued)

*Primary Examiner* — Shew-Fen Lin
(74) *Attorney, Agent, or Firm* — Judy Yee; Micky Minhas (57) ABSTRACT

Linking data items describing a person into a single, unified contact entry without merging the data items. The data items include, for example, contact data, social network data, and other data describing the person. The contact entry is a single representation of the person that, in some embodiments, combines a plurality of personas of the person without merging the underlying data items. Metadata representing one or more contact entries is capable of being shared across a plurality of devices and applications such that a user is presented with a consistent contact list on different devices and from within different applications. In some embodiments, the user annotates one or more of the contact entries with notes or other data that is stored with the metadata.

20 Claims, 5 Drawing Sheets

(56) References Cited

U.S. PATENT DOCUMENTS

| | | | |
|---|---|---|---|
| 2008/0316925 A1* | 12/2008 | Dolin et al. | 370/232 |
| 2009/0138475 A1 | 5/2009 | Caulkins | |
| 2009/0157717 A1* | 6/2009 | Palahnuk et al. | 707/101 |
| 2009/0209286 A1 | 8/2009 | Bentley et al. | |
| 2010/0070910 A1* | 3/2010 | Zimmerman et al. | 715/781 |
| 2010/0153284 A1* | 6/2010 | Hoag et al. | 705/319 |

OTHER PUBLICATIONS

Ganapati Priya, "Hands-On: Can Kin Phones Make Microsoft Cool Again?", Retrieved at <<http://www.wired.com/gadgetlab/2010/04/microsoft-kin-phone-first-look/>>, Apr. 12, 2010, pp. 14.

Eldon, "Facebook's iPhone App Gets New Push and Sync Features", Inside Facebook, Retrieved from <http://www.insidefacebook.com/2010/01/06/facebooks-iphone-app-gets-new-push-and-syn . . . >, Jan. 6, 2010, 7 pages.

Tschida, "Facebook Finally Gets Push Notifications and Contact Syncing", Retrieved from <http://appadvice.com/appnn/2010/01/facebook-finally-gets-push-notifications-and-contact- . . . >, Jan. 6, 2010, 13 pages.

Boyle et al., "Android 2.0 contact sync / status provider", Seesmic, 2010, 2 pages.

Unknown, "MOTOBLUR: CONTACTS: Frequently Asked Questions", Motorola, Inc., Retrieved from <http://www.motorola.com/Support/US-EN/Support-Homepage/Motoblur+Support/Co . . . >, Retrieved on Aug. 11, 2010, 2 pages.

Unknown, "Pam Pre Sync Solutions", Treonauts.com, Retrieved from <http://blog.treonauts.com/2009/06/palm-pre-sync-solutions.html>, Jun. 6, 2009, 17 pages.

Aanabathula, "Palm Pixi—Sprint (Review)", Retrieved from <<http://skattertech.com/2009112/palm-pixi-sprint-review, Dec. 17, 2009, 5 pages.

Unknown, "How Does the Palm Synergy Feature Work?", Retrieved from <http://kb.palm.com/wps/portal/kb/common/article/33923_en.html>, Retrieved on Aug. 5, 2010, 3 pages.

Unknown, "Sync Contacts between Phone, Facebook, and Gmail", Google, Retrieved from <http://www.google.com/support/forum/p/android/thread?tid=3c014274f87ab154&hl=en>, Retrieved on Aug. 10, 2010, 5 pages.

Unknown, "HTC Sense", Wikipedia, Retrieved from <http://en.wikipedia.org/wiki/HTC_Sense>, Retrieved on Aug. 11, 2010, 5 pages.

McDowell, "Sync your Android Phone and PC with USB Cable", Retrieved from <http://www.gadgetsdna.com/download-free-cl-usb-sync-app-for-android-device/704/>, Dec. 22, 2009, 5 pages.

Unknown, "HTC—Support", HTC Corporation, Retrieved from <http://www.htc.com/www/support.aspx>, Retrieved on Aug. 11, 2010, 2 pages.

Unknown, "User Guide: Facebook for Blackberry Smartphones," Research in Motion Limited, Canada, Retrieved 2010, 16 pages.

Unknown, "Facebook on Nokia Soon", Retrieved from <http://www.dancewithshadows.com/tech/facebook-on-nokia-soon/>, Feb. 13, 2009, 8 pages.

Ward, Chris, "Motorola FLIPOUT: MOTOBLUR—Contacts", Jul. 29, 2010, Retrieved from <<http://blog.clove.co.uk/2010/07/29/motorola-flipout-motoblur-contacts/>>, 7 pages.

* cited by examiner

AUTOMATIC CONTACT LINKING FROM MULTIPLE SOURCES

BACKGROUND

Many users have contact data stored in multiple different data sources. For example, a typical user may have contact data for work-related colleagues stored in a work email system, contact data for classmates stored in a school-provided computing system, and contact data for social acquaintances stored with several different social networking websites. The same person may have different contact data in several of the data sources. For example, a work telephone number for a user may be stored in contact data in the work email system, a school email address for the same user may be stored in contact data in the school-provided computing system, and a mobile telephone number for the same user may be stored in contact data in a social networking website. With contact data stored in the multiple different data sources, users have difficulty identifying which of the data areas stores particular contact data. For example, a user may have to search through several different data areas to find the email address of another user.

Some existing systems allow users to merge the contact information from the different data areas by copying the contact information into a new contact entry for each user and deleting duplicate information. With these existing systems, however, the users manually select and identify the contact data for merging. Further, because the contact data is copied into the new contact entry, the users have to manually update the new contact entry when changes are made to the original contact data in each of the data areas.

SUMMARY

Embodiments of the disclosure link data items for a person to create contact entries representing aggregated data. Data sources available from a computing device of a device user are accessed. The data sources provide data items associated with a plurality of users. The data items provided by each of the accessed data sources are searched to identify groups of the data items. Each of the groups is associated with one of the plurality of users. Each of the identified groups is analyzed to identify false-positive data items within each of the identified groups. The identified false-positive data items are removed from the groups. Without seeking approval from the device user after identifying the groups of the data items and without modifying the data items stored by the data sources, one contact entry for each of the plurality of users associated with one of the groups is created. Each of the contact entries provides the data items associated with one of the groups. The created contact entries are provided to the device user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, embodiments of the disclosure enable data from separate sources to be automatically linked to a single contact entry 110 (e.g., without merging the underlying data). In some embodiments, a device user 102 of a computing device 104 (e.g., a mobile telephone) identifies data items 302 including contact entries, data within the contact entries, social content data, and other data items describing people (e.g., other users). Aspects of the disclosure search the data items 302 to create groups of data items 302 without modifying the data items 302 as stored by the sources. Each of the groups is considered to be a single contact entry 110, and each is associated with one of the users. False-positive operations are performed to minimize erroneous groupings. Each of the groups includes metadata defining links 112 or references to the underlying data items 302. In some embodiments, the metadata is available to the applications executing on the computing device 104 such that the device user 102 is presented with unified, consistent contact entries 110 across the applications.

Aspects of the disclosure represent each of the linked contact entries 110 (e.g., group) with a single name and picture. The device user 102 may identify preferences for revising the contact name and picture selected by aspects of the disclosure from the data items 302 linked to the single contact entry 110. For example, the picture may be selected in one or more of the following ways: the picture most recently updated is selected, the picture is explicitly selected by the device user 102, the picture is selected from a social networking website from which a status update was last posted, the picture is selected from the social networking website having the most recently updated picture, and the picture is selected from other accounts available on the computing device 104 (e.g., selected in the order in which the accounts were added).

Each of the groups of linked contact entries 110 includes metadata representing data from multiple sources 124. The data from the multiple sources 124 includes, in some embodiments, one or more of the following: contact name, picture, communication methods (e.g., telephone, electronic mail address, etc.) and social content such as social feed information, status updates, and other types of non-contact information. In some embodiments, the metadata includes one or more of the following: data store identifier, contact type, favorite status, ringtone, and information on whether the contact entity meets certain criteria (e.g., has phone, email, and/or store information).

Figure 1:
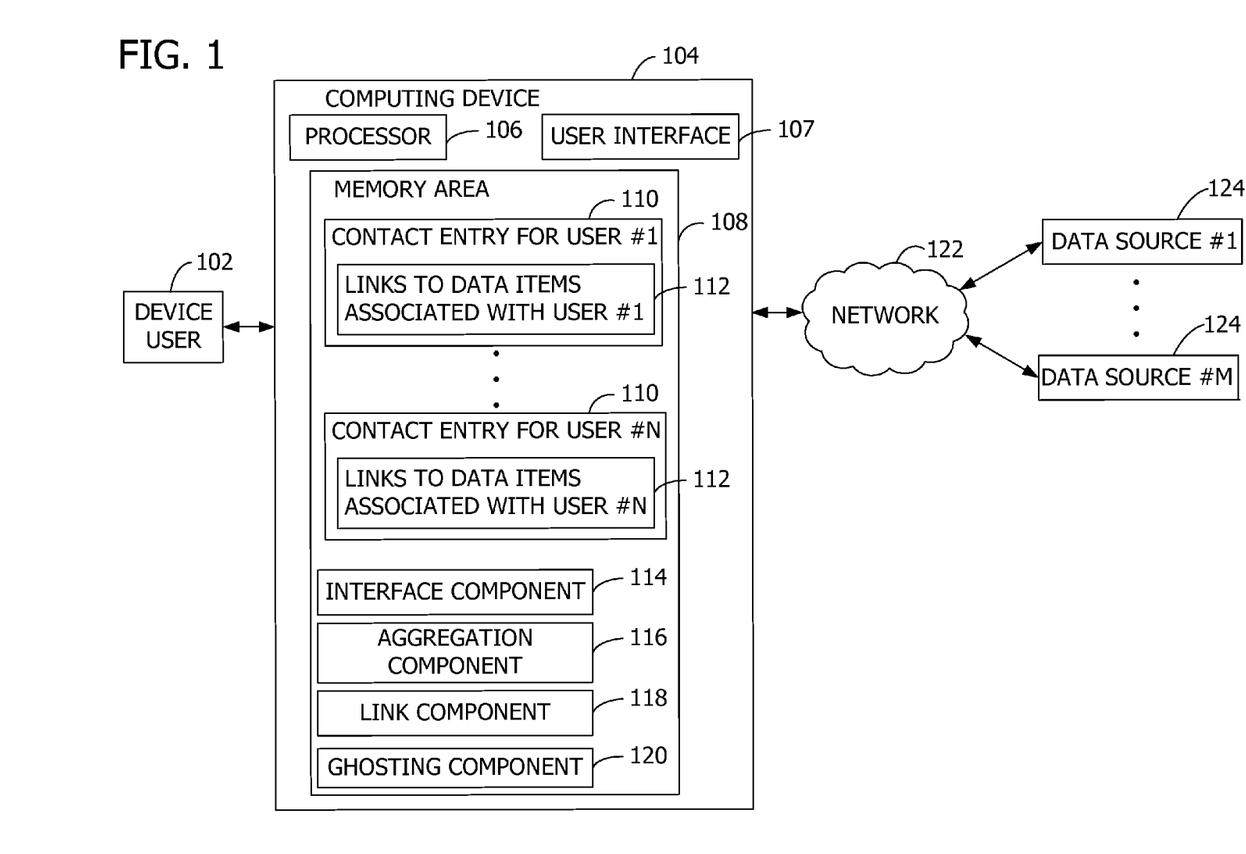
FIG. 1 is an exemplary block diagram illustrating a computing device creating aggregated contact entries from a plurality of data sources.

Referring again to FIG. 1, an exemplary block diagram illustrates the computing device 104 creating aggregated contact entries 110 from a plurality of data sources 124. In the example of FIG. 1, the computing device 104 is associated with the device user 102. The computing device 104 represents any device executing instructions (e.g., as application programs, operating system functionality, or both) to implement the operations and functionality associated with the computing device 104. The computing device 104 may include a mobile computing device 502 or any other portable device. In some embodiments, the mobile computing device 502 includes a mobile telephone, laptop, netbook, gaming device, and/or portable media player. The computing device 104 may also include less portable devices such as desktop personal computers, kiosks, and tabletop devices. Additionally, the computing device 104 may represent a group of processing units or other computing devices.

The computing device 104 has at least one processor 106, a user interface 107, and a memory area 108 (e.g., persistent memory). The processor 106 includes any quantity of processing units, and is programmed to execute computer-executable instructions for implementing aspects of the disclosure. The instructions may be performed by the processor 106 or by multiple processors executing within the computing device 104, or performed by a processor external to the computing device 104. In some embodiments, the processor 106 is programmed to execute instructions such as those illustrated in the figures (e.g., FIG. 3 and FIG. 4).

The user interface 107 includes any interface for communicating with the device user 102 of the computing device 104. For example, the user interface 107 may provide content to the device user 102 visually (e.g., via a screen such as a touch screen), audibly (e.g., via a speaker), and/or via touch (e.g., vibrations or other movement from the computing device 104). In another example, the user interface 107 may receive from the user tactile input (e.g., via buttons, an alphanumeric keypad, or a screen such as a touch screen) and/or audio input (e.g., via a microphone). In further embodiments, the computing device 104 itself acts as the user interface 107 as the device user 102 moves the computing device 104 in a particular way to input commands or manipulate data.

The computing device 104 further has one or more computer-readable media such as the memory area 108. The memory area 108 includes any quantity of media associated with or accessible to the computing device 104. The memory area 108 may be internal to the computing device 104 (as shown in FIG. 1), external to the computing device 104 (not shown), or both (not shown).

The memory area 108 stores, among other data, a plurality of contact entries 110 such as contact entry #1 through contact entry #N. Each of the plurality of contact entries 110 references data items 302 associated with one of a plurality of users. For example, each of the contact entries 110 includes links 112 to the data items 302 associated with one of the plurality of users, such as links to data items associated with user #1 through links to data items associated with user #N.

Other embodiments of the disclosure contemplate the memory area 108 storing a plurality of data items each referencing one or more contact entries. In such embodiments, each of the data items stores the links 112. Such embodiments are semantically different from, yet substantively similar to, the embodiment illustrated in FIG. 1.

In some embodiments, the data items 302 include one or more of the following items of contact information: names, telephone numbers, and electronic mail addresses. In further embodiments, the data items 302 include one or more of the following items of biographical data: job titles, company names, birthdays, and street addresses. In still further embodiments, the data items 302 include one or more of the following: electronic mail message data, instant message data, social network message data, and microblog data. The data items 302 are provided by data sources 124 remote from the computing device 104 as illustrated in FIG. 1 or provided by data sources stored local to the computing device 104 (not shown). The data sources 124 include, for example, data source #1 through data source #M. The computing device 104 accesses the data sources 124 via a network 122 such as the Internet. The network 122 includes, however, any wired and/or wireless network over which one or more protocols may be implemented.

The memory area 108 further stores applications (not shown) that, when executed by the processor 106, operate to perform functionality on the computing device 104. Exemplary applications include mail application programs, web browsers, calendar application programs, and address book application programs. Each of the applications may store data items 302 on one or more of the data sources 124.

In some embodiments (not shown), the memory area 108 further stores cached versions of the items stored by the data sources 124.

The memory area 108 further stores one or more computer-executable components. Exemplary components include an interface component 114, an aggregation component 116, a link component 118, and a ghosting component 120. The interface component 114, when executed by the processor 106 of the computing device 104, causes the processor 106 to receive, from the device user 102 associated with the computing device 104, one or more first data items associated with one of a plurality of users. The aggregation component 116, when executed by the processor 106 of the computing device 104, causes the processor 106 to search the data sources 124 (or the cached versions thereof stored in the memory area 108) based on the first data items received by the interface component 114 to identify second data items stored by one or more of the data sources 124. In some embodiments, the aggregation component 116 does not access the network 122 when searching for data items to link, but instead searches the memory area 108 for the data items.

The link component 118, when executed by the processor 106 of the computing device 104, causes the processor 106 to define a group including the first data items and the second data items identified by the aggregation component 116. In some embodiments, the defined group includes at least one of the data items. The defined group is associated with the one of the plurality of users. For example, the defined group represents the data items associated with a particular user. In some embodiments, the link component 118 updates an existing group with the first data items received by the interface component 114 and with the second data items identified by the aggregation component 116. For example, the first data items and the second data items are linked to another group or contact. The group may include a single data item.

When further executed, the link component 118 creates one contact entry 110 providing access to the first data items and to the second data items associated with the defined group. While the link component 118 does not merge or modify the first data items or the second data items during the act of linking, the device user 102 is able to modify any of the first data items (that are read-write) or the second data items (that are read-write) linked to the created contact entry 110. The data modified by the user is then synchronized back to the data sources 124 (or other data sources associated with the first data items or the second data items).

The link component 118 creates the contact entry 110 without seeking approval from the device user 102 after defining the group. The interface component 114 provides the created contact entry 110 to the device user 102. As illustrated in the example of FIG. 1, the contact entry 110 may include links 112 or other metadata identifying the first data items and the second data items. In some embodiments, the metadata representing the contact entries 110 may be shared among other computing devices enabling the device user 102 to have access to the same aggregated contact entries 110 from any of the other computing devices.

In some embodiments, the link component 118 further executes to analyze the defined group to identify false-positive matches in the second data items. False-positive matches include data items that were linked incorrectly or inappropriately (e.g., data items linked to the same person that are actually associated with different people). The link component 118 removes the identified false-positive matches from the defined group.

The ghosting component 120, when executed by the processor 106 of the computing device 104, causes the processor 106 to receive an annotation from the device user 102 and to store the received annotation with the contact entry 110 created by the link component 118. The annotation is stored without modifying the first data items associated with the defined group and without modifying the second data items associated with the defined group. The annotation is associated with the defined group and includes, for example, private or sensitive data, or any other note or text the device user 102 wants to associate with the contact entry 110. For example, the annotation is stored as a field in the contact entries 110 along with fields storing the corresponding links 112 to the first and second data items.

In other embodiments, a new contact entry is created based on the contact entry 110 (e.g., inherits data from the contact entry 110 such as the links 112). The annotation is then stored with this new contact entry rather than with the contact entry 110.

In some embodiments, the interface component 114, the aggregation component 116, the link component 118, and the ghosting component 120 execute as part of an operating system associated with the computing device 104.

Additional operation details and architecture are described with reference to the figures next described.

Figure 2:
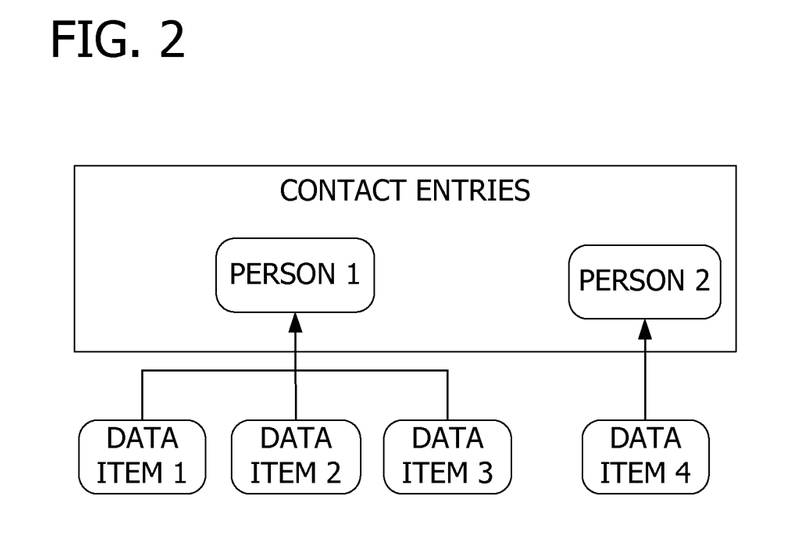
FIG. 2 is an exemplary block diagram illustrating linking between contact entries and a plurality of data items.

Referring next to FIG. 2, an exemplary block diagram illustrates linking between contact entries 110 and a plurality of data items. Each contact entry 110 represents a person such as Person 1 or Person 2. Each person is represented by an aggregation or group of data items associated with each person. In the example of FIG. 2, Data Item 1, Data Item 2, and Data Item 3 are linked to Person 1. Data Item 4 is linked to Person 2.

Figure 3:
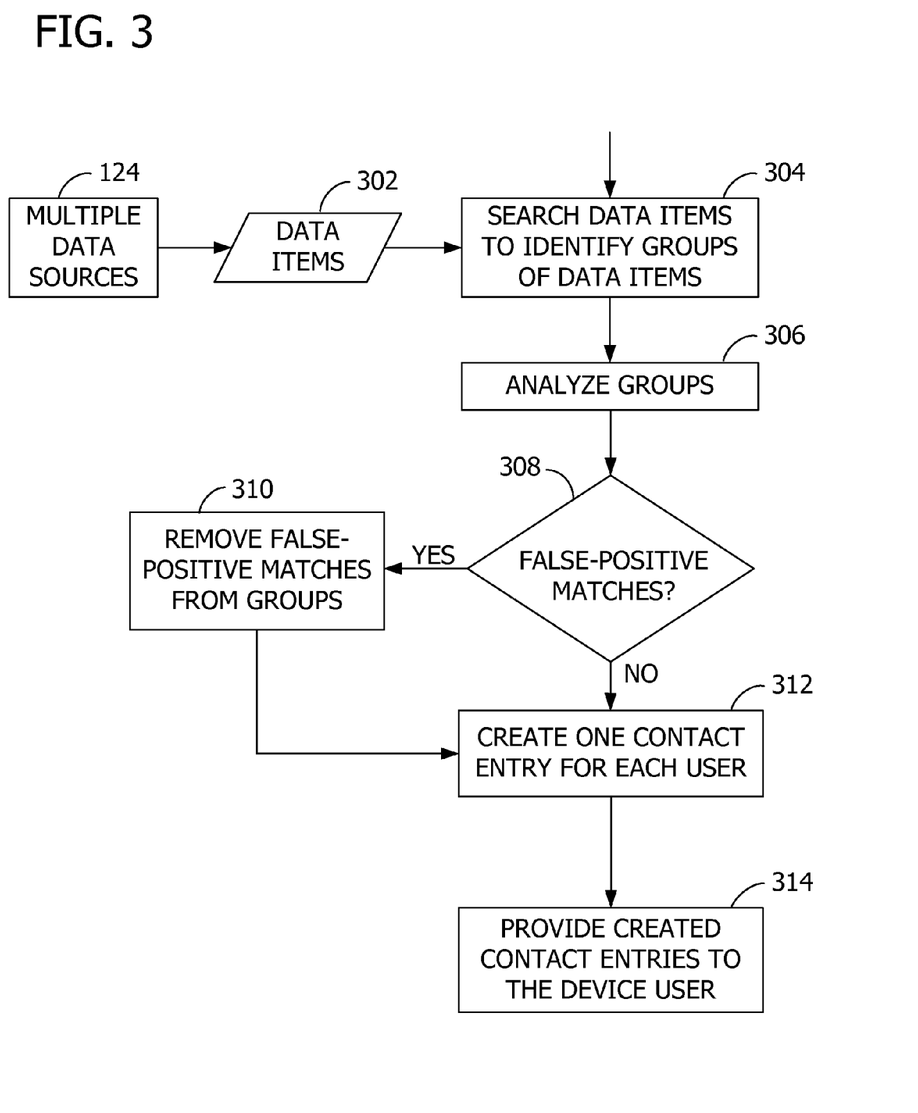
FIG. 3 is an exemplary flow chart illustrating operation of a computing device to create aggregated contact entries from multiple data sources.

Referring next to FIG. 3, an exemplary flow chart illustrates operation of the computing device 104 to create aggregated contact entries 110 from multiple data sources 124. While FIG. 3 illustrates the creation of groups based on the searching of data items 302, other embodiments contemplate searching the existing groups to see if any are a match for the data items 302 as the data items 302 are received by the computing device 104. In such embodiments, if no existing groups are deemed to be a match for a particular data item 302, a new contact entry is created for the particular data item 302.

Data items 302 from multiple data sources 124 are available to the computing device 104. The data items 302 are associated with a plurality of users. The computing device 104 searches the data items 302 at 304 to identify groups of the data items 302. For example, the computing device 104 searches for exact matches of the first and last names of the users as gating criteria, and uses email addresses and telephone numbers as corroborating data. In other examples, the computing device 104 also searches for common email addresses, postal addresses, etc. as additional gating criteria. In further embodiments, searching the data items 302 includes searching one or more of the following for data items 302 associated with the same user: contact information, electronic mail message data, instant message data, social network message data, and microblog data. The searching produces one or more groups of data items 302 where each of the groups is associated with one of the plurality of users and each of the data items 302 within the group is associated with the one of the plurality of users.

The groups are analyzed at 306. For example, the computing device 104 searches for false-positive matches, or other mis-matched data items 302 within the groups. In some embodiments, false-positive data item matches are identified by comparing one or more of the following among the data items 302 within each of the groups: middle names, suffixes, telephone numbers, and electronic mail addresses.

If false-positive matches are found at 308, the false-positive matches are purged or otherwise removed from the groups at 310. If no false-positive matches are found at 308 or once the false-positives have been removed from the groups, one contact entry 110 is created for each of the users at 312.

In some embodiments (not shown), the groups are formed iteratively with false-positive matches being removed before the groups are actually defined. For example, one contact record after another is examined (e.g., serially) to decide whether to include the contact record in the group. False-positive contact records are rejected prior to being included in the group.

The contact entries 110 are created automatically, or otherwise without seeking approval from the device user 102 after identifying the groups of the data items 302, or as the groups are identified. Further, the contact entries 110 are created without modifying the data items 302 as stored by the data sources 124. Each of the created (or updated) contact entries 110 includes, for example, metadata describing the particular user and links 112 or other references to each of the data items 302 associated with the particular user (e.g., group).

The created contact entries 110 are provided to the device user 102 at 314. The device user 102 interacts with the contact entries 110 with the computing device 104. For example, the device user 102 views the contact entries 110 in an address book application executing on the computing device 104. In some embodiments, the device user 102 can edit the groups by manually adding other data items 302 or removing some of the linked data items 302 from the groups. In further embodiments, the device user 102 is able to add annotations or other notes to one or more of the contact entries 110. For example, the device user 102 may add comments, personal or private opinions, and/or sensitive, non-public information associated with the users represented by the contact entries 110. In such embodiments, the computing device 104 receives an annotation from the device user 102 for one or more of the created contact entries 110 and stores the received annotation with the corresponding created contact entries 110 (e.g., along with the metadata currently in the contact entries 110). The annotations do not modify the linked data items 302 in embodiments in which the linked data items 302 are read-only, but the annotations may be propagated back (e.g., synchronized) to the data sources 124.

Other embodiments create a writeable contact entry in another store (e.g., portion of the memory area 108) that is linked to, and based on, one of the existing contact entries that is read-only. The annotation is then stored with the writeable contact entry and synchronizes to one or more of the data sources 124. In such embodiments, the annotation is not stored with the read-only, existing contact entry, the linked data items 302 are not modified, and the annotation is synchronized to one or more of the data sources 124 (e.g., to prevent loss of the annotation should the computing device 104 be lost or misplaced).

In some embodiments, the contact entries 110 are stored in the cloud or other storage remote from the computing device 104 so that the device user 102 can access the contact entries 110 from other devices. For example, the device user 102 may access the contact entries 110 from a mobile telephone, work computer, computer at a library, gaming console, and/or netbook.

The example of FIG. 3 illustrates a conservative approach for linking data items 302 that may not link some data items 302 that should be linked. Aspects of the disclosure may be modified, within the scope of the disclosure, to more aggressively link data items 302 to increase the quantity of linked data items 302. In such embodiments, the suggested groupings may be presented to the device user 102 for confirmation.

Figure 4:
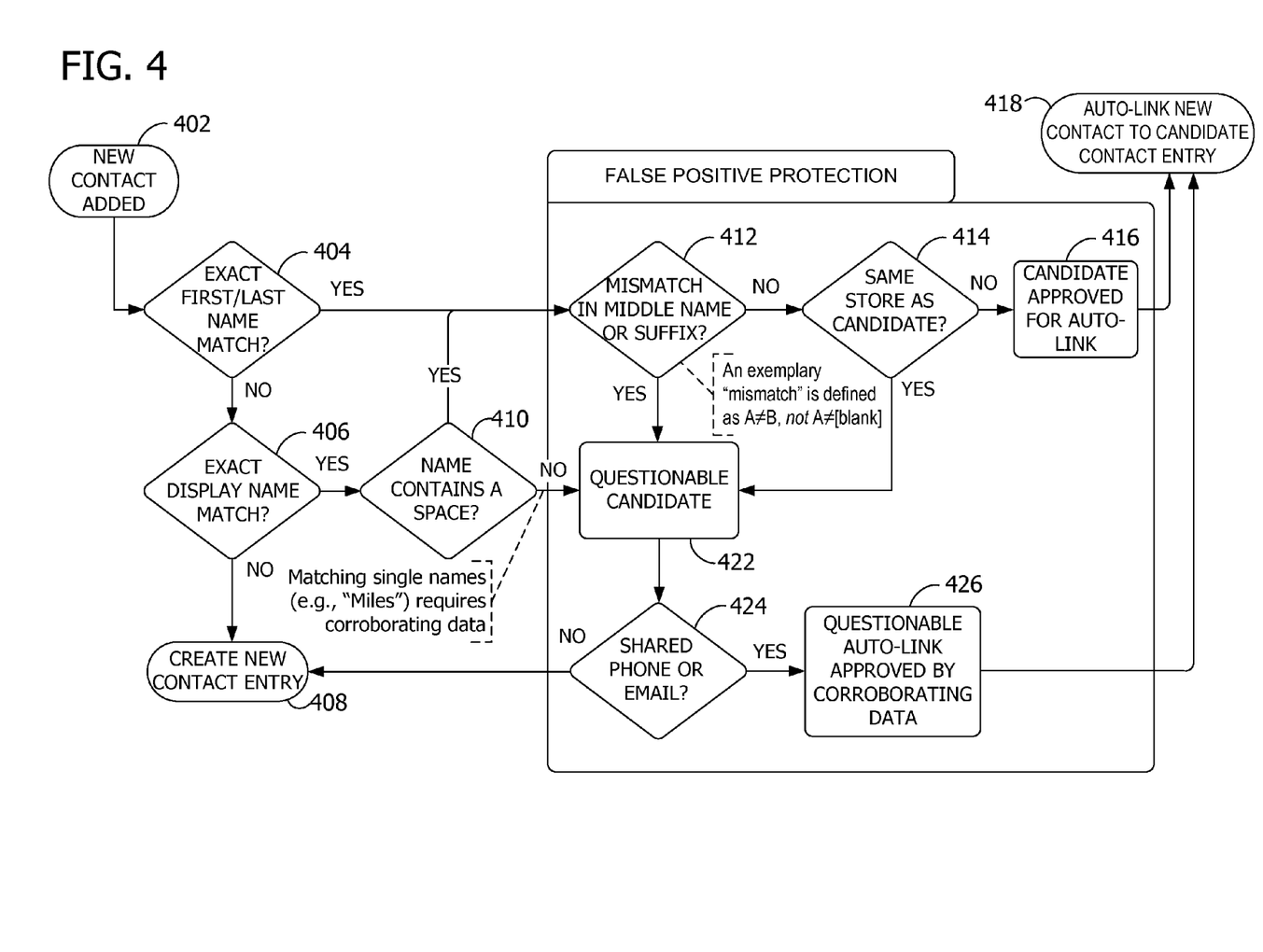
FIG. 4 is an exemplary flow chart illustrating operation of a computing device to detect false positive matches when automatically linking contact entries.

Referring next to FIG. 4, an exemplary flow chart illustrates operation of the computing device 104 to detect false positive matches when automatically linking contact entries 110. In contrast to the flow illustrated in FIG. 3 (e.g., in which data items or data sources are searched to create groups), the flow in FIG. 4 illustrates matching data items to existing groups (e.g., existing contact entries). For example, for each data item received by the computing device 104, the existing contact entries are searched to identify a matching contact entry (e.g., a candidate match). The received data item is compared to one or more of the data items associated with the matching contact entry to determine whether or not the matching contact entry is a false-positive match. If the matching contact entry is not a false-positive match, the matching contact entry is updated to be associated with the received data item. The matching contact entry is updated, for example, without seeking approval from the device user and without modifying the received data item and/or the data items associated with the matching contact entry. If the matching contact entry is a false-positive match, a new contact entry may be created for the received data item. A further example of the exemplary process is next described.

The operations illustrated in FIG. 4 are performed at various times including, for example, automatically when a new contact is added by the device user 102 at 402. If there is not an exact first and last name match between the names of the new contact and any of the existing contact entries 110 at 404, and there is not an exact match between display names of the new contact and any of the existing contact entries 110 at 406, a new contact entry is created at 408. If there is an exact match at 404, or if there is not an exact first and last name match at 404 but there is a display name match at 406, the matching contact entry (or a plurality of matching contact entries 110) is regarded as a candidate contract entry. False positive protection is performed on the candidate contact entry to confirm that the candidate contact entry is not a false positive match. In some embodiments, the process determines whether the new contact name contains a space at 410 then proceeds to perform false positive protection operations. The existence of a space helps determine, in some embodiments, whether sufficient information exists to create a link.

In the example of FIG. 4, the false positive protection operations are performed when there is an exact match at 404, or when there is not an exact match at 404 but there is an exact match at 406 (whether or not the name contains a space at 410). False positive protection includes, for example, comparing one or more of the following between the new contact entry and the candidate contact entry: middle name, suffix, store (e.g., the service associated with the contact entry), telephone number, and electronic mail address.

If there is a mismatch between the middle names or suffixes of the new contact and the candidate contact entry at 412, the candidate contact entry is considered to be questionable at 422. If there is not a mismatch at 412 and the new contact and the candidate contact entry are not associated with the same store at 414, the candidate contact entry is approved at 416. For example, the operations execute to prevent two contacts from the same social networking website to be linked automatically without corroborating data. If the new contact and the candidate contact entry are associated with the same store at 414, the candidate contact entry is considered to be questionable at 422. Otherwise, the candidate contact entry is approved at 416.

If the candidate contact entry has been marked as questionable at 422, one or more of the telephone numbers and electronic mail addresses of the new contact and the candidate contact entry are compared at 424. If there is no shared data at 424, a new contact entry is created at 408. If there is shared data at 424, the shared data is considered to be corroborating data and the questionable candidate contact entry is approved at 426.

After the candidate contact entry is approved at 416 or 426, the new contact is automatically linked to the candidate contact entry at 418. In other embodiments not illustrated in FIG. 4, the candidate contact entry is presented to the device user 102 for explicit or manual approval by the device user 102 before the new contact is linked to the candidate contact entry at 418.

In some embodiments (not shown), the false positive protection operations further calculate, generate, or otherwise produce a confidence factor for the identified candidate contact entry. The confidence factor represents the confidence or probability that the candidate contact entry is an appropriate match to the new contact input by the device user 102.

Figure 5:
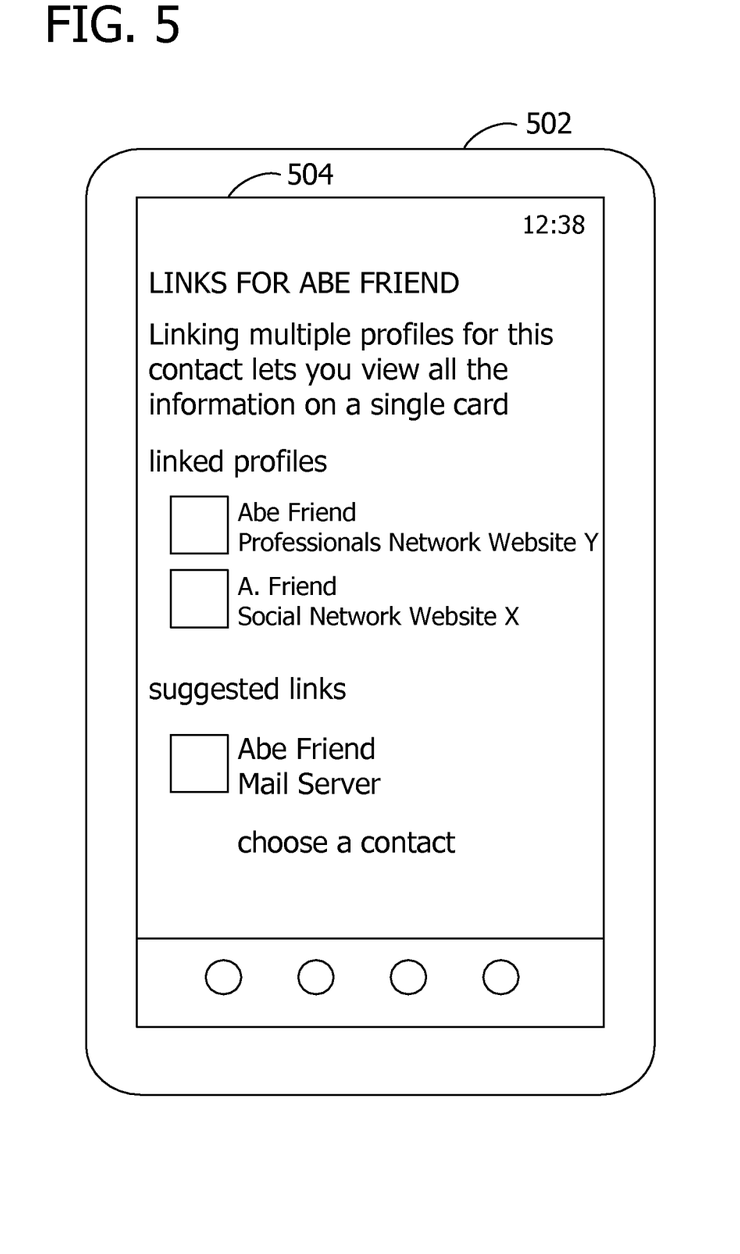
FIG. 5 is an exemplary mobile computing device illustrating linked contact entries and suggested contact entries to link in a user interface.

Referring next to FIG. 5, an exemplary mobile computing device 502 illustrates linked contact entries and suggested contact entries to link in a user interface 504. In the example of FIG. 5, the contact entries are referred to as profiles. The user interface 504 shows the linked profiles and the suggested profiles for linking for an exemplary contact "A. Friend" when a user of the mobile computing device 502 (e.g., device user 102) accesses contacts (e.g., chooses to view links from viewing a contact entry from an address book application). The linked profiles include "Abe Friend" from the Professionals Network Website Y and "A. Friend" from the Social Network Website X. The suggested profile to be linked is "Abe Friend" on a Mail Server. The Professionals Network Website Y, the Social Network Website X, and the Mail Server represent stores (e.g., data stores) hosting, storing, or otherwise affiliated with the corresponding profiles.

The user interface 504 allows the user to select the suggested profile for linking, or deselect any of the existing linked profiles (e.g., unlink the profiles). In some embodiments, the profiles are automatically linked only when new contact entries are added to avoid automatically re-linking the profiles that were unlinked by the user.

As the user links additional profiles, the profiles are added to the list of linked profiles shown in the user interface 504. When finished linking profiles, the user returns to the contacts application (or other address book type of application) to view aggregated data from all the linked profiles. For each group of linked profiles, the data is shown as a single, unified contact in each application executing on the mobile computing device 502 that displays contact information. That is, each of the applications is able to access the metadata representing the linked profiles.

Additional Examples

In some embodiments, the metadata representing the linked contact entries includes conditional metadata defining when to display the linked contact entries 110, and when to display only the contact entries 110 associated with a particular application or store. For example, each contact entry 110 includes data identifying the associated application, and the user can choose to see only the contact entries 110 associated with a particular application. For example, the device user 102 may define the conditional metadata to display the linked contact entries 110 only during non-business hours so that data from contact entries 110 associated with social networking websites is not displayed while the device user 102 is at work. In another example, the device user 102 may define the conditional metadata to display the linked contact entries 110 based on a location of the mobile computing device 502 (e.g., via global positioning satellite technology in the mobile computing device 502). In such an example, the device user 102 may opt for the linked contact entries 110 to be displayed at locations other than locations designated as "work" locations.

In still another example, the conditional metadata may be defined to display the linked contact entries 110 based on the execution of other applications. In this example, the device user 102 may opt for the linked contact entries 110 to be displayed if social networking applications or gaming applications are being executed on the mobile computing device 502.

In an example scenario, the user of the mobile computing device 502 configures the mobile computing device 502 to access personal accounts such as social network accounts. Shortly after configuration, the mobile computing device 502 executes operations such as described herein to automatically link matching contact entries across the accounts. The user notices that there are no duplicate contact entries, but there are some standalone, unlinked contact entries with nicknames or incomplete data that prevented linking. Aspects of the disclosure may provide suggestions for linking the remaining contact entries. The user is quickly able to manually link one or more of these remaining contact entries to other contact entries. In this example scenario, the mobile computing device 502 has intelligently linked the obvious matches (or those with a high confidence factor) to simplify the out-of-box experience for the user.

At least a portion of the functionality of the various elements in FIG. 1 may be performed by other elements in FIG. 1, or an entity (e.g., processor, web service, server, application program, computing device, etc.) not shown in FIG. 1.

In some embodiments, each of the operations illustrated in FIG. 3 are performed by the same computing device 104. In other embodiments, one or more of the operations illustrated in FIG. 3 are performed by another computing device (e.g., as a web service). Similarly, in some embodiments, each of the operations illustrated in FIG. 4 are performed by the same computing device 104. In other embodiments, one or more of the operations illustrated in FIG. 4 are performed by another computing device (e.g., as a web service). Further, the operations illustrated in FIG. 3 and FIG. 4 may be implemented as software instructions encoded on a computer-readable medium, in hardware programmed or designed to perform the operations, or both.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media store information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for determining whether the matching contact entry is a false-positive match, and exemplary means for combining the data items to create groups of the data items, wherein each of the groups is associated with one of the users.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system comprising:
   a memory area associated with a mobile computing device of a device user, said memory area storing a plurality of contact entries, the plurality of contact entries associated with data items relating to a plurality of users, said data items being provided by data sources; and
   a processor programmed to:
   receive, from the data sources, at least one of the data items associated with one of the plurality of users;
   search the plurality of contact entries stored in the memory area based on the received data item to identify a matching contact entry;
   compare the received data item, that is used for the search to identify the matching contact entry, with one or more of the data items associated with the matching contact entry;
   determine whether the matching contact entry is a false-positive match based on a confidence factor for the matching contact entry;
   store, as a single contact entry representing the one of the plurality of users, without seeking approval from the device user, without merging the received data item and the data items associated with the matching contact entry, and without modifying the received data item and the data items associated with the matching contact entry, the received data item with the matching contact entry based on the determination that no false-positive matches are found; and
   provide a user interface that allows the device user to unlink one or more existing linked contact entries representing the one of the plurality of users and provides suggestions for linking one or more unlinked contact entries having incomplete data to the matching contact entry of the single contact entry, wherein the one or more existing linked contact entries and the one or more unlinked contact entries are displayed in the same user interface.

2. The system of claim 1, wherein the processor is further programmed to:
   receive an annotation from the device user; and
   store said received annotation with the matching contact entry without modifying the received data item and the data items associated with the matching contact entry.

3. The system of claim 1, wherein the processor is further configured to transmit one or more of the plurality of contact entries stored in the memory area to another computing device associated with the device user.

4. The system of claim 1, wherein the processor is further configured to:
   receive a request from the device user to remove one or more of the data items from one of the plurality of contact entries;
   responsive to the received request, remove said one or more of the data items from the one of the plurality of contact entries; and
   create another contact entry to store the removed data items.

5. The system of claim 1, wherein the data items comprise one or more of the following: contact information, electronic mail message data, instant message data, social network message data, and microblog data.

6. The system of claim 1, further comprising means for determining whether the matching contact entry is the false-positive match.

7. The system of claim 1, further comprising means for combining the data items to create groups of the data items, wherein the groups are associated with the plurality of users.

8. A method comprising:
   accessing data sources available to a computing device of a device user, said data sources providing data items associated with a plurality of users;
   searching the data items provided by the accessed data sources to identify groups of the data items, wherein one of the identified groups is associated with one of the plurality of users;
   analyzing the identified groups to identify false-positive data items within the identified groups based on a confidence factor for each of the identified groups;
   removing the identified false-positive data items within the identified groups;
   creating, without seeking approval from the device user after removing the identified false-positive data items within the identified groups and without modifying the data items stored by the data sources, contact entries for the identified groups to provide access to the data items associated with the identified groups, wherein a contact entry of the created contact entries is a single representation of the one of the plurality of users, the single representation combining the data items stored in the data sources by automatically linking the data sources without merging the data items from the data sources; and
   providing the created contact entries to the device user; and
   presenting a user interface that allows the device user to unlink one or more existing linked contact entries, representing the one of the plurality of users, from one of the created contact entries and provides suggestions for linking one or more unlinked contact entries having incomplete data to the one of the contact entries, wherein the existing linked contact entries and the one or more unlinked contact entries are displayed in the same user interface.

9. The method of claim 8, wherein searching the data items comprises searching one or more of the following: contact information, electronic mail message data, instant message data, social network message data, and microblog data.

10. The method of claim 8, further comprising storing links, for accessing the data items associated with the one of the plurality of users from the data sources, as metadata within the created contact entries, the metadata including information defining display of the one of the created contact entries based on an application executing on the computing device.

11. The method of claim 8, further comprising providing the metadata to another computing device associated with the device user.

12. The method of claim 8, further comprising identifying the false-positive data items by comparing one or more of the following among the data items within each of the identified groups: middle names, suffixes, telephone numbers, and electronic mail addresses.

13. The method of claim 8, further comprising:
   receiving an annotation from the device user for the one of the created contact entries; and storing said received annotation with the one of the created contact entries without modifying the data items associated with the one of the created contact entries and stored by the data sources.

14. The method of claim 8, further comprising:
receiving a request from the device user to remove one or more of the data items from at least one of the identified groups; and
responsive to the received request, removing said one or more of the data items from said at least one of the identified groups.

15. The method of claim 8, wherein the data items comprise one or more of the following: contact information, electronic mail message data, instant message data, social network message data, and microblog data.

16. One or more computer storage media storing computer-executable components, said components comprising:
an interface component that when executed by at least one processor of a computing device causes the at least one processor to receive, from a device user associated with the computing device, one or more first data items associated with one of a plurality of users;
an aggregation component that when executed by at least one processor of the computing device causes the at least one processor to search data sources based on the one or more first data items received by the interface component to identify second data items stored by one or more of the data sources;
a link component that when executed by at least one processor of the computing device causes the at least one processor to:
define a group including the one or more first data items and the second data items identified by the aggregation component, wherein the defined group is associated with said one of the plurality of users; and
create, without seeking approval from the device user after defining the group, one contact entry providing read-only access to the one or more first data items and second data items associated with the defined group, the one contact entry further providing suggestions for linking additional data items, wherein the interface component further provides the created contact entry to the device user; and
a ghosting component that when executed by at least one processor of the computing device causes the at least one processor to receive an annotation from the device user and to store the received annotation without modifying the one or more first data items associated with the defined group and without modifying the second data items associated with the defined group, the received annotation being stored in a writeable contact entry linked to and created based on the one contact entry without storing the annotation in the one contact entry.

17. The computer storage media of claim 16, wherein the link component is further executed to:
analyze the defined group to identify false-positive matches in the second data items; and
remove the identified false-positive matches from the defined group.

18. The computer storage media of claim 16, wherein the link component defines the group by updating an existing group with the one or more first data items received by the interface component and with the second data items identified by the aggregation component, wherein a plurality of groups are formed iteratively with false-positive matches being removed before the group is defined.

19. The computer storage media of claim 16, wherein the link component defines the group by creating metadata identifying the one or more first data items and the second data items identified by the aggregation component.

20. The computer storage media of claim 19, wherein the link component provides the metadata created by the link component to another computing device of the device user as one or more links to the first data items and second data items, the one or more links enabling the device user to access the one contact entry from the another computing device.

* * * * *